United States Patent
Albers et al.

(10) Patent No.: US 11,304,434 B2
(45) Date of Patent: Apr. 19, 2022

(54) METHOD FOR PRODUCING HYDROCOLLOID WITH IMPROVED WATER-BINDING ABILITY

(71) Applicant: DEUTSCHES INSTITUT FÜR LEBENSMITTELTECHNIK E.V, Quakenbrueck (DE)

(72) Inventors: Dieter Albers, Bad Rothenfelde (DE); Kemal Aganovic, Quakenbrueck (DE); Knut Franke, Quakenbrueck (DE)

(73) Assignee: DEUTSCHES INSTITUT FÜR LEBENSMITTELTECHNIK E.V., Quakenbrück (DE)

( * ) Notice: Subject to any disclaimer, the term of this patent is extended or adjusted under 35 U.S.C. 154(b) by 288 days.

(21) Appl. No.: 16/308,220

(22) PCT Filed: Jun. 8, 2017

(86) PCT No.: PCT/EP2017/064023
§ 371 (c)(1),
(2) Date: Jun. 3, 2019

(87) PCT Pub. No.: WO2017/211986
PCT Pub. Date: Dec. 14, 2017

(65) Prior Publication Data
US 2019/0350243 A1    Nov. 21, 2019

(30) Foreign Application Priority Data
Jun. 9, 2016  (EP) .................... 16173690

(51) Int. Cl.
| | | |
|---|---|---|
| *A23L 29/256* | (2016.01) | |
| *A23L 13/40* | (2016.01) | |
| *A23L 13/60* | (2016.01) | |
| *C08B 37/00* | (2006.01) | |
| *C08L 5/00* | (2006.01) | |

(52) U.S. Cl.
CPC .......... *A23L 29/256* (2016.08); *A23L 13/422* (2016.08); *A23L 13/60* (2016.08); *C08B 37/0042* (2013.01); *C08L 5/00* (2013.01); *A23V 2002/00* (2013.01)

(58) Field of Classification Search
CPC .......... A23V 2002/00; A23V 2200/254; A23V 2250/51084; A23V 2250/50362; A23V 2250/50364; A23V 2250/5086; A23V 2250/5108; A23V 2250/21; A23V 2300/26; A23V 2250/5036; A23V 2200/242; A23V 2250/51088; A23L 29/256; A23L 13/422; C08B 37/0042; C08L 5/00
See application file for complete search history.

(56) References Cited

U.S. PATENT DOCUMENTS

| | | | |
|---|---|---|---|
| 4,096,327 A | | 6/1978 | Guiseley |
| 5,462,761 A | * | 10/1995 | McGinley ............... A23G 9/52 |
| | | | 426/453 |
| 2005/0236121 A1 | * | 10/2005 | Kondo ...................... C08J 3/12 |
| | | | 162/100 |
| 2007/0212475 A1 | | 9/2007 | Augustin |
| 2008/0317789 A1 | | 12/2008 | Trudso |

FOREIGN PATENT DOCUMENTS

| | | |
|---|---|---|
| EP | 0949294 A1 | 10/1999 |
| EP | 1873196 A1 | 1/2008 |
| EP | 2226171 | 9/2010 |
| JP | 07070365 | 3/1995 |
| JP | H0770365 A | 3/1995 |
| WO | O9102463 A1 | 3/1991 |
| WO | 03035701 A1 | 5/2003 |

OTHER PUBLICATIONS

Wikipedia, Starch Gelatinization, Jul. 21, 2021. (Year: 2021).*
Saha, Dipjyoti, Suvendu Bhattacharya, Hydrocolloids as thickening and gelling agents in food: a critical review, J Food Sci Technol (Nov.-Dec. 2010) 47(6):587-597. (Year: 2010).*
Wang et al, "Effect of High-Pressure Homogenization on the Structure and Thermal Properties of Maize Starch", Journal of Food Engineering No. 87.pp. 436-444, 2008.
Yoshioka et al, "Fabrication of Pulverized Cellulosics by Ulta High-Pressure Water Jet Treatment and Usage in Polymer Nanoomposites and Graft Copolymerization", The Japan Research Society, pp. 335-343, 2009.
Thanh-Blicharz et al., "Starch Modified by High-Pressure Homogenisation of the Pastes—Some Structural and Physico-Chemical Aspects", Food Hydrocolloids 27, pp. 347-354, 2012.
Villay et al., "Comparison of Polysaccharide Degradations by Dynamic High-Pressure Homogenization", Food Hydrocolloids 27, pp. 278-286, 2012.
Reginelli, International Search Report for Application No. PCT/EP2017/064023, dated Aug. 18, 2017.
Harte et al., "A Model for Viscosity Reduction in Polysaccharides Subjected to High-Pressure Homogenization", Journal of Texture Studies, 2010, pp. 49-61, vol. 41, Wiley Periodicals, Inc.

* cited by examiner

*Primary Examiner* — Hong T Yoo
(74) *Attorney, Agent, or Firm* — Greer, Burns & Crain, Ltd.; Steven P. Fallon

(57) ABSTRACT

The invention relates to a method for producing a hydrocolloid with an improved water-binding ability in which the hydrocolloid is treated in a mixture with water in a high pressure homogenization process at at least 100 MPa.

11 Claims, 1 Drawing Sheet

METHOD FOR PRODUCING HYDROCOLLOID WITH IMPROVED WATER-BINDING ABILITY

Figure 1:
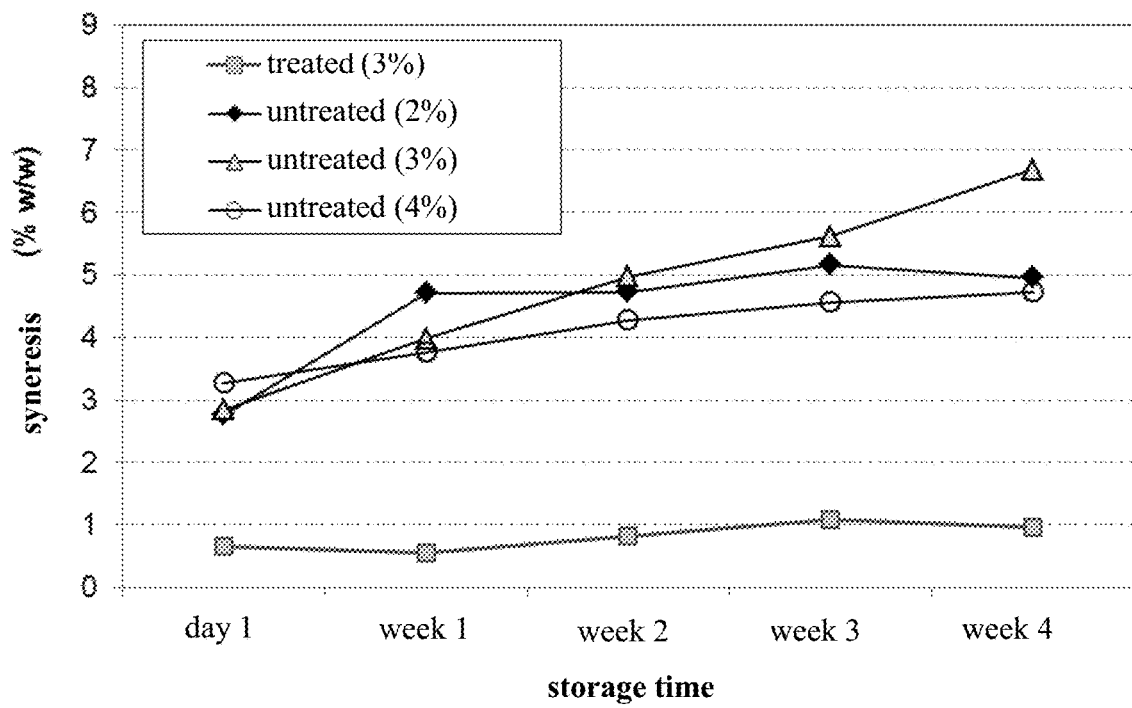

The present invention relates to a process for producing a hydrocolloid, which is especially a polysaccharide, which in comparison to the hydrocolloid not treated by the process according to the invention has a higher and/or more stable water binding capacity in a gel, and especially a lower syneresis and/or a higher gel strength. The process has the advantage that the hydrocolloid is not treated chemically and that by the process no additional chemical groups are introduced into a natural hydrocolloid.

Correspondingly, the invention also relates to the hydrocolloid produced by the process, as well as to its use, especially as an additive to foods, e.g. as a thickening agent in liquid or paste-like foods and/or for binding of water in solid foods. Further, the invention relates to the production of foods with the step of adding the hydrocolloid produced by the process, as well as to foods having a content of the hydrocolloid produced by the process.

U.S. Pat. No. 4,096,327 A describes the chemical modification of κ(kappa)-carrageenan by introduction of $C_2$- to $C_3$-hydroxalkyl groups in order to obtain for the corresponding gel a lower syneresis and a melting point lower by 10-20° C.

US 2008/0317789 A1 describes the production of (ι)jota-carrageenan, having a lower content of cations in order to obtain a lower melting point of the corresponding gel, starting from precipitated carrageenan produced from an extract of seaweed.

US 2007/0212457 A1 describes the increase of the water binding of starch that has a high amylose proportion by means of microfluidisation in which a fluid is pressed through two separate channels and jets produced thereby are directed against one another. As a result small starch corns having a narrow size distribution shall be produced. Alternatively, static high pressure or ultrasound shall be utilized.

EP 18573196 A1 describes the high pressure homogenization of suspended cellulose which subsequently in dry form forms a constituent of tablets.

Le Thanh-Blicharz et al., Food Hydrocolloids, page 347-354 (2011) describes the influence of the high pressure homogenization of potato starch at 22 MPa at 67.5° C. for 11 min on the digestability and structure, especially the wettability.

WO 03/035701 A1 describes the treatment of carrageenan at pressures of up to 80 bar (8 MPa), e.g. by means of an extruder.

WO 91/02463 A1 for a fat-free food describes the warming and shearing of microcristalline cellulose over a pressure difference of 827 bar (82.7 MPa) and the subsequent addition of xanthan.

OBJECT OF THE INVENTION

It is the object of the invention to provide an alternative process for producing a hydrocolloid that has a lower tendency for syneresis and preferably a higher binding capacity for water. Preferably the process shall not introduce chemical groups into natural hydrocolloid.

DESCRIPTION OF THE INVENTION

The invention achieves the object by the features of the claims, and especially by a process in which hydrocolloid in mixture with water, optionally a solution of the hydrocolloid, is treated by a high pressure homogenization which comprises a release over a pressure difference of at least 100 MPa, preferably of at least 200 MPa or at least 400 MPa through a nozzle, or consists thereof. According to the invention it is preferred that the entire pressure difference is applied to the hydrocolloid in mixture with water and directly subsequently the pressure difference is released through at least one nozzle. The high pressure homogenization can be single-stage by release of the pressure difference through exactly one nozzle or at least two-stage by release through at least two consecutive nozzles through which in total the total pressure difference is released. In an at least two-stage release of the pressure difference it is preferred that across each nozzle a pressure difference of at least 1 MPa, more preferred of at least 5 to 10 MPa is released. Preferably the pressure difference is released to environmental pressure. For an at least two-stage release of the pressure difference a conduit can conduct the hydrocolloid in a mixture with water between the nozzles.

The hydrocolloid is carrageenan, or a mixture with carrageenan and one of xanthan, starch, agar-agar, alginate, locust bean gum, guar gum, pectin, cellulose, carboxymethyl cellulose, methyl cellulose, hydroxymethyl cellulose. For the production of a mixture of at least two hydrocolloids each hydrocolloid singly in mixture with water can be treated by he process, wherein the treated hydrocolloids are subsequently mixed. Alternatively, a mixture of at least two hydrocolloids in water can be produced and subsequently be treated by the process. Preferred mixtures of hydrocolloids are kappa-carrageenan with locust bean gum, preferably to 70 parts by weight kappa-carrageenan with 30 parts by weight locust bean gum, kappa-carrageenan with xanthan, preferably to 80 parts by weight kappa-carrageenan with 20 parts by weight xanthan, alginate with pectin, preferably to 95 parts by weight alginate with 5 parts by weight pectin.

The nozzle can be a conventional nozzle of a high pressure-homogenizer through which a liquid passes, while a pressure difference that is applied to a liquid is released.

The mixture of the hydrocolloid with water can be a suspension or a solution. Optionally, the warming of the mixture of the hydrocolloid with water to a temperature sufficient for dissolving the hydrocolloid can be obtained by applying the pressure difference, which subsequently is released at the passage through the nozzle, and especially by the passage of the mixture through the nozzle upon release of the pressure difference. The temperature increase by the application up to the pressure difference onto the mixture of the hydrocolloid with water amounts to ca. 2 to 3 K per 100 MPa, the temperature increase by the release of the pressure difference amounts to ca. 15 to 20 K per 100 MPa. Optionally, prior to the application of the pressure difference, the mixture of the hydrocolloid with water can have a temperature which by the temperature increase due to the application of the pressure difference and the subsequent release of the pressure difference results in a temperature at which the hydrocolloid is in solution. Preferably the temperature of the mixture is the one which is measured after the release through the at least one nozzle, e.g. in a collecting container. For K-carrageenan the minimum temperature for dissolving in water is 55° C. Thus it has shown that K-carrageenan in suspension with water at 15° C. by the subsequent process is warmed to a temperature at which it is in solution if the pressure difference that is released amounts to at least 200 MPa. The process results in a hydrocolloid which at room temperature forms a gel having a significantly higher water binding capacity, a significantly lower syneresis and a significantly higher storage modulus G' as a measure for the gel strength.

Preferably the mixture of the hydrocolloid with water has no additives, so that the water can be pure water, e.g. deionised or distilled water, or drinking water.

The carrageenan can be kappa-carrageenan, jota-carrageenan, lambda-carrageenan or a mixture of at least two of these, preferably the carrageenan is kappa(κ)-carrageenan, which essentially consists of D-galactose and 3,6-anhydro-6-galactose, which alternatingly are bound to one another β1-4 and α1-3 glycosidically, optionally in part esterified with sulfate groups. The carrageenan is preferably produced from red algae, e.g. *Eucheuma spinosum* and *Eucheuma cottonii*, by aqueous extraction with alkali, separation of undissolved components and precipitation from the soluble phase, e.g. with salt, especially KCl, and/or with alcohol, especially isopropanol.

It is generally preferred to mix the hydrocolloid in water at a temperature below the minimum temperature for the dissolution, e.g. at 0 to 40° C., and to subsequently warm this mixture to at least the minimum temperature for the dissolution, preferably by application of the pressure difference and its subsequent release.

The aqueous mixture of carrageenan can be a mixture produced during the extraction of carrageenan from red algae without intermediate drying, or can be produced by mixing of dried carrageenan, especially κ-carrageenan, in water. The aqueous mixture of the hydrocolloid, e.g. of carrageenan, preferably contains 1 to 10 wt.-% hydrocolloid, more preferably 2 to 4 wt.-%.

After the high pressure homogenization, the process can have the step of drying the solution, e.g. by spray drying, fluidized bed drying or freeze drying. For the spray drying and fluidized bed drying it is preferred that the solution is dried directly after the release of the pressure difference, without additional cooling after the release. Preferably during the fluidized bed drying the high pressure homogenized solution of the hydrocolloid is sprayed onto a carrier suitable for food, e.g. dextrose and/or lactose.

Optionally the process can provide adding the solution to a food mass after the release of the pressure difference in the form of a solution without intermediate drying.

The process results in an increase of the gel strength and gel stability of the hydrocolloid so that e.g. the syneresis is reduced and the storage modulus G' is increased, and therefore a lower addition of the hydrocolloid is sufficient for the same gel strength.

Figure 2:
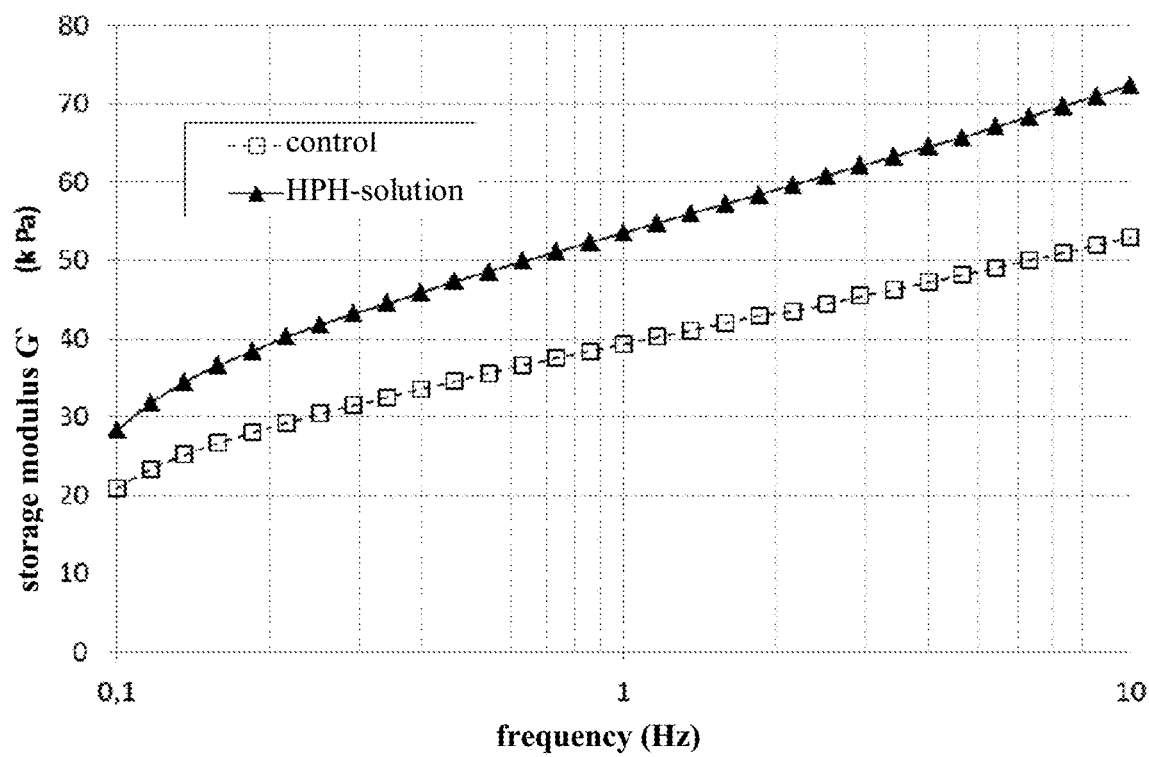

The process is now explained in greater detail by way of examples in which κ-carrageenan as a representative hydrocolloid was high pressure homogenized and as a comparison (control, untreated) the original κ-carrageenan of the same batch was used, respectively, which was not high pressure homogenized. Therein, FIG. 1 shows measurement values for the syneresis of gels of the carrageenan produced according to the invention and of gels of the original carrageenan for comparison (untreated), and FIG. 2 shows measurement values for the storage modulus of cooked sausage having a content of carrageenan produced according to the invention and for comparison for cooked sausage with untreated carrageenan (control).

EXAMPLE 1: PRODUCTION OF HYDROCOLLOID HAVING AN INCREASED WATER BINDING CAPACITY

As an example for a hydrocolloid, kappa-carrageenan (κ-carrageenan), obtainable from Eurogum A/S, Herlev, Denmark, was manually dispersed to 3 wt.-% in tap water. The water temperature was chosen such that following build-up and release of pressure at least the dissolution temperature of this hydrocolloid of 55° C. was reached. The dispersion was high pressure homogenized over a pressure difference of 100 MPa, 200 MPa or 300 MPa. For this, a high pressure homogenizer (Stansted Fluid Power, Great Britain, Model FPG11300:350) was utilised, which releases the pressure difference of the carrageenan in water across two consecutive high pressure valves as nozzles. By the process the mixture of carrageenan in water at a pressure difference of 300 MPa was warmed from an initial ca. 20° C. to ca. 70° C., which was measured after the passage through the nozzles. The solution of the treated carrageenan obtained was allowed to cool to room temperature.

The immobilisation of water of the treated carrageenan, and for comparison of the originally utilised carrageenan that was warmed to ca. 70° C. for producing a solution by means of a heat exchanger, was measured by centrifugation. For this, solidified gels with 2, 3, 4 or 5 wt.-% carrageenan in water were each centrifuged at 20° C. for 10 min at 10000×g. Subsequently, the water removed by centrifugation was withdrawn, weighed and considered as non-immobilised water.

Proportion of Water Removed from Gel by Centrifugation in g/100 g Total Water Content of the Gel:

| homogenization pressure | concentration of κ-carrageenan (wt./wt.) | | | |
| --- | --- | --- | --- | --- |
| (MPa) | 2% | 3% | 4% | 5% |
| without (control) | 8.37 | 6.75 | 6.63 | 8.66 |
| 100 | 6.77 | 6.69 | 5.34 | 3.11 |
| 200 | 4.36 | 1.73 | 4.89 | 3.10 |
| 300 | 3.35 | 2.87 | 4.07 | 5.79 |

It becomes clear that the proportion of water removable by centrifugation, which therefore is not immobilized in the gel network, is higher in gels having the original, respectively untreated carrageenan (control) than in the gels of the carrageenan high pressure-homogenized according to the invention. At a homogenization pressure of at least 200 MPa or 300 MPa, especially in 2% and 3% gels, the proportion of water removable by centrifugation is clearly lower than in the control gel.

By choosing a suitable initial temperature of the mixture of hydrocolloid and water prior to application of the pressure difference, which is released subsequently during the high pressure homogenization, the immobilization of water by the treated hydrocolloid can be influenced. The following table shows that the proportion of water removable by centrifugation is reduced in 3 wt.-% gels (20° C., 10000×g, 10 min) of the same k-carrageenan at high pressure homogenization for lower temperatures of the initial mixture for the high pressure homogenization.

| pressure difference, resp. homogenization pressure | initial temperature of the solution | | | |
| --- | --- | --- | --- | --- |
| (MPa) | 20° C. | 30° C. | 40° C. | 50° C. |
| 100 | 10.03 | 6.69 | 3.40 | 4.32 |
| 200 | 3.01 | 1.73 | 2.26 | 3.82 |
| 300 | 2.00 | 2.87 | 4.63 | n.m.* |

*not measured

By way of the example of κ-carrageenan in gels of the hydrocolloids treated according to the invention a reduction of the liberation of water during storage shows, also referred to as syneresis. The syneresis is regarded a consequence of the water immobilization diminishing during the storage, caused by structural changes in the gel. Following the cooling of gel of water and 3 wt.-% κ-carrageenan treated according to the invention, and for comparison of gels having 2, 3 and 4 wt.-% of the original κ-carrageenan, there is shown a significantly lower syneresis for the gel of hydrocolloid treated according to the invention. For this, the cooled gels that were formed were stored in closed vessels at 5° C. in a refrigerator for at maximum 4 weeks. For determination of the syneresis one gel each was carefully removed from the vessel after 1 week each and the weight of the escaped water on the bottom of the vessel was determined. Therein, for each measurement a separate vessel having a gel was only utilized once and was subsequently discarded so that each measurement is independent from the others. The syneresis was calculated in wt.-% in relation to the initial total mass of each gel (ca. 120 g).

FIG. 1 shows the measurement values for 3 wt.-% gels of original k-carrageenan (untreated) and of k-carrageenan that was high pressure-homogenized according to the invention at 200 MPa. The measurement values clearly show that κ-carrageenan treated according to the invention has a considerably reduced syneresis after 1 day for up to at least 4 weeks in contrast to gels of original, untreated κ-carrageenan.

The proportion of the water bound more stably by the hydrocolloid was quantified by way of the humidity that could not be freezed out, which was determined by means of the dynamic differential calorimetry (DSC). Therein, the gel of 3% of the originally used carrageenan or the gel of 3% of the carrageenan high pressure-homogenized according to the invention was frozen at −60° C. and subsequently the quantity of heat necessary for thawing was measured in a DSC-apparatus. The mass of water that was solidified up to the temperature of −60° C. and correspondingly thawed could be determined using the known freezing enthalpy of water. The mass of water that was not solidified to ice crystals was regarded as firmly bound water. The amount of firmly bound water was ca. 3% in the gel of the used original carrageenan, ca. 5 to 10% in the gel of the carrageenan high pressure-homogenized according to the invention.

Comparative Example: Homogenization of κ-Carrageenan Solution at 4 MPa or 8 MPa

As a comparison, κ-carrageenan was mixed to 2 wt.-% or 3 wt.-% in tap water and was warmed to 90° C. for the complete dissolution. This solution was homogenized by means of a homogenizer (APVB) over a pressure difference of 4 MPa, respectively 8 MPa, subsequently bottled and allowed to cool, then stored at 5° C. The measurement of the immobilisation of water was done by centrifugation at 10000×g for 10 min as described in Example 1. The following table shows that by this homogenization the proportion of water separable by centrifugation only increases.

| pressure | concentration | |
|---|---|---|
| | 2% solution | 3% solution |
| without pressure | 8.37 | 6.75 |
| 4 MPa | 8.0 | 9.2 |
| 8 MPa | 10.9 | 7.9 |

In comparison to the gels that were produced by the high pressure process in Example 1, the gels of the K-carrageenan that was homogenized over a pressure difference of 4 or 8 MPa, show more water separable by centrifugation, which corresponds to a clearly lower immobilization of water.

EXAMPLE 2: COOKED HAM WITH CARRAGEENAN

A cooked ham was produced with the following composition:
shoulder (sheer, pork) 5.000 kg
water/ice 2.412 kg
nitrite curing salt 0.160 kg
dextrose 0.360 kg
κ-carrageenan 0.040 kg
Na-diphosphate 0.024 kg
Na-ascorbate 0.004 kg
total mass 8.000 kg For a cooked ham with hydrocolloid produced according to the invention, κ-carrageenan was used that was high pressure homogenized at 200 MPa according to Example 1, and for comparison the original carrageenan (control).

The carrageenan solution produced by the process according to the invention was spray dried with addition of dextrose (90% dextrose, 10% carrageenan) as carrier. The total mass of dextrose in the cooked ham was adjusted to the same for κ-carrageenan treated according to the invention and for original κ-carrageenan.

The meat was initially size-reduced by means of a combination of a rough-cutter, knife and pre-cutter to approximately 4 cm. The other ingredients were stirred in the ice water to a brine and together with the pre-size reduced meat were given into a conventional tumbler (horizontal rotation axis of drum, make MGH-20, company Valkona) and tumbled therein for 3 h at 20 rpm and 4° C. The tumbled meat mixture was filled into sterile casings having a diameter of 90 mm and these are subsequently scalded in a vat at 78° C. until reaching a core temperature of 72° C.

After scalding, the cooling initially was in ice water and thereafter overnight in a cold store at 4° C. The next day the casing was removed and cooking losses were determined by way of the drained weights. The values are represented in the following table:

Cooking Losses of Cooked Ham with κ-Carrageenan Treated According to the Invention and for Comparison with Untreated Carrageenan:

| treatment of the carrageenan | repetition | mass of bacon (kg) | | cooking loss | |
|---|---|---|---|---|---|
| | | gross | net | absolut (g) | relative |
| high pressure-homogenized | 1 | 1.776 | 1.770 | 6 | 0.34% |
| | 2 | 1.576 | 1.571 | 6 | 0.31% |
| without (control) | 1 | 1.905 | 1.876 | 29 | 1.52% |
| | 2 | 1.883 | 1.852 | 31 | 1.67% |

The results show that for the carrageenan treated according to the invention the cooking loss in cooked ham is significantly reduced, resulting in a clearly increased yield and respective economic advantages for the user. In combination with the lower syneresis it is to be expected that the hydrocolloid that is high pressure-homogenized according to the invention also results in a more stable storage, respectively in a higher quality of the meat product.

EXAMPLE 3: COOKED SAUSAGE WITH CARRAGEENAN

Cooked sausage was produced by a process that was adapted to industrial production using the following recipe, one time using 200 MPa high pressure-homogenized κ-carrageenan, produced according to Example 1, and one time using original κ-carrageenan (control), wherein the total mass of κ-carrageenan in water in each case was the same:

| component | proportion in the recipe (kg) | |
| --- | --- | --- |
| | control | using carrageenan according to the invention |
| liver | 2.000 | 2.000 |
| pork meat S II | 2.000 | 2.000 |
| pork meat S V | 3.500 | 3.500 |
| bacon of pork S VIII | 1.500 | 1.500 |
| water (95° C.) | 0.980 | 0.333 |
| salt | 0.180 | 0.180 |
| carrageenan solution (3% w/w) | — | 0.667 |
| carrageenan powder | 0.020 | |
| total | 10.180 | 10.180 |

In both batches the meat was each initially cooked at 95° C. in a bag. Thereafter the complete contents of the bag at approximately 90° C. was introduced into a mincer and by this minced to a size of 2 mm. The carrageenan solution having a temperature of ca. 55 to 60° C. in combination with the additional water was dosed into the cutter. When utilizing the carrageenan powder (control), this was given into the cutter together with water. Subsequently, each mixture was finely cuttered, wherein in the end a temperature of ca. 70° C. resulted. In parallel to cuttering the meat the liver was cuttered at 4° C. together with the salt in a second device until bubbly and at 45° C. was added to the meat in the first cutter. Cuttering was continued so long until the liver was completely finely distributed. This mass was filled into liver sausage casings and scalded in a water bath of 78° C. to a core temperature of 72° C. The cooling of the sausages was firstly done in ice water and thereafter overnight in a cold store at 4° C.

The finished sausages were subsequently temperature controlled to 7° C. and at this temperature were rheological by measured by means of oscillation in a frequency range between 0.1 and 10 Hz. For this a cone-plate-system having a diameter of 4 cm and a cone angle of 4° was used. In this measurement method amplitudes are selected to be so small that the gels are loaded only in the linear viscoelastic range and the structures are not destroyed thereby. The storage modulus G' measured is a measure for the strength of the gels.

The result of these measurements is depicted in FIG. 2. The higher strength of the cooked sausage of the κ-carrageenan according to the invention (HPH-solution) is clearly seen in contrast to the sample of the untreated κ-carrageenan (control). The increase in strength of ca. 29% that can be reached with the κ-carrageenan according to the invention illustrates the savings potential in the addition of κ-carrageenan that can be reached by the process according to the invention.

The invention claimed is:

1. A process for increasing or stabilizing water binding capacity of carrageenan, comprising:
applying a pressure difference of at least 200 MPa across at least one nozzle to an initial mixture including carrageenan with water, wherein the initial mixture of the carrageenan with the water contains 2 to 4 wt.-% of carrageenan, wherein the initial mixture of the carrageenan with the water is subjected to at least a dissolution temperature of the carrageenan in the water;
releasing the pressure difference across the at least one nozzle to provide a treated mixture including the carrageenan having an increased or stabilized water binding capacity than in the initial mixture.

2. The process according to claim 1, comprising cooling the treated mixture to form a gel, wherein the carrageenan in the gel has lower syneresis and/or higher gel strength than in the initial mixture.

3. The process according to claim 1, wherein the pressure difference is released in at least two stages through at least two nozzles and a pressure difference of at least 1 MPa is released through each of the nozzles.

4. The process according to claim 3, wherein the pressure difference that is released through each of the nozzles is a pressure of at least 5 MPa.

5. The process according to claim 1, wherein the initial mixture comprises the carrageenan with at least one of xanthan, starch, agar-agar, alginate, locust bean gum, guar gum, pectin, cellulose, carboxymethyl cellulose, methylcellulose or hydroxymethyl cellulose.

6. The process according claim 1, wherein the initial mixture comprises suspension or a solution of the carrageenan.

7. The process according to claim 1, wherein the initial mixture has a temperature of at least 55° C. due to the applying and releasing.

8. The process according to claim 1, wherein the initial mixture has a temperature of up to 90° C. due to the applying and releasing.

9. The process according to claim 1, comprising drying the treated mixture of the carrageenan with water subsequent to the releasing by spray drying or fluidized bed drying.

10. A process for creating a food mass including the treated mixture provided by the process according claim 1, comprising mixing the treated mixture into a food mass subsequent to the releasing.

11. The process according to claim 1, wherein the initial mixture comprises a 3 wt.-% mixture of the carrageenan in water having a temperature of 30° C.

* * * * *